US008723078B2

(12) United States Patent  
Mazumder et al.

(10) Patent No.: US 8,723,078 B2  
(45) Date of Patent: May 13, 2014

(54) MONITORING OF A WELDING PROCESS (75) Inventors: Jyoti Mazumder, Ann Arbor, MI (US); Seung H. Lee, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 526 days.

(21) Appl. No.: 12/623,249

(22) Filed: Nov. 20, 2009

(65) Prior Publication Data

US 2010/0133247 A1 Jun. 3, 2010

Related U.S. Application Data (60) Provisional application No. 61/116,821, filed on Nov. 21, 2008.

(51) Int. Cl.
*B23K 9/00* (2006.01)
(52) U.S. Cl.
USPC ..................................... 219/121.83
(58) Field of Classification Search
USPC ........................ 219/121.63–121.64
See application file for complete search history.

(56) References Cited

U.S. PATENT DOCUMENTS

| 5,026,979 A * | 6/1991 | Ortiz et al. ............. 250/205 |
| 5,681,490 A | 10/1997 | Chang |
| 5,961,859 A | 10/1999 | Chou et al. |
| 2002/0144984 A1 * | 10/2002 | Mori et al. ............. 219/121.64 |
| 2007/0289955 A1 * | 12/2007 | Tsukamoto et al. ..... 219/121.64 |

FOREIGN PATENT DOCUMENTS

WO WO-2008/070784 A1 6/2008

OTHER PUBLICATIONS

H.R. Griem, "Principles of Plasma Spectroscopy", 2005; pp. 187-192, 281-284.
K. Mori, "In-process Monitoring of Laser Welding by the Analysis of Ripples in the Plasma Emission"; Journal of Laser Applications, 1997; pp. 155-159.
Ward's Automotive Yearbook, 2006; pp. 25-27.
Office of Aerospace and Automotive Industries, International Trade Administration U.S. Department of Commerce; "The Road Ahead for the U.S. Auto Industry", 2006.
Ramakrishna Koganti et al., "Aluminum Vehicle Body Construction and Enabling Manufacturing Technologies", SAE Technical Paper, 2008.
Kurucz Atomic Line Database, Harvard-Smithsonian Center for Astrophysics; http://cfa-www.harvard.edu/amp/arnpdata/kurucz23/sekur.html.
W.M. Steen, "Laser Material Processing" pp. 191-196.

* cited by examiner

*Primary Examiner* — David Vu
*Assistant Examiner* — Jonathan Han
(74) *Attorney, Agent, or Firm* — Harness, Dickey & Pierce, P.L.C.

(57) ABSTRACT

A method of monitoring a welding process, comprising detecting a selected portion of a light spectrum of plasma plume of a fusion welding process with a photo detector, processing the detected portion of the spectrum, comparing the detected portion of the spectrum with an expected spectra to determine whether a weld is acceptable, providing a signal to a welder control, and adjusting the weld process based on the signal.

21 Claims, 9 Drawing Sheets

MONITORING OF A WELDING PROCESS

CROSS-REFERENCE TO RELATED APPLICATIONS

This application claims the benefit of U.S. Provisional Application Ser. No. 61/116,821 filed Nov. 21, 2008, which is hereby incorporated by reference in its entirety.

STATEMENT REGARDING FEDERALLY SPONSORED RESEARCH OR DEVELOPMENT

This invention was made with government support under EEC0438917 awarded by the National Science Foundation. The government has certain rights in the invention.

BACKGROUND

Many industries, including the automotive industry, use zinc-coated steel materials to form various structures, including automobile frames and bodies. Creating such structures typically requires using one or more types of welding. While zinc provides excellent corrosion resistance to steel, zinc can also cause difficulties during welding.

During fusion welding, for example, explosive zinc vapor can form and cause undesirable spattering of the weld metal, as well as extensive porosity in the weld after solidification. In other words, there is a relation between the quality of a weld, and the amount of vaporized zinc present during the welding process. The issue of porosity is more significant in certain types of welds, such as lap welds, which are a preferred welding method for automotive body fabrication. Thus, the scrap rate in this type of welding process is typically higher, forcing manufacturers to incur material losses to maintain certain quality standards. Manufacturers that weld zinc-coated steel materials would benefit from improved welding techniques and in-process quality control methods.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present inventive concepts. Further, the embodiments set forth herein are not intended to be exhaustive or otherwise limit or restrict the claims to the precise forms and configurations shown in the drawings and disclosed in the following detailed description. In addition, where the drawings show calculations, graphs, or data plots, such graphical representations are simply illustrative of the present inventive concepts and not intended to be exact representations.

FIG. 12 is a graphical illustration of the spectral signal variation paralleled with an illustration of the weld with a partial burn through;

DETAILED DESCRIPTION

Figure 1:
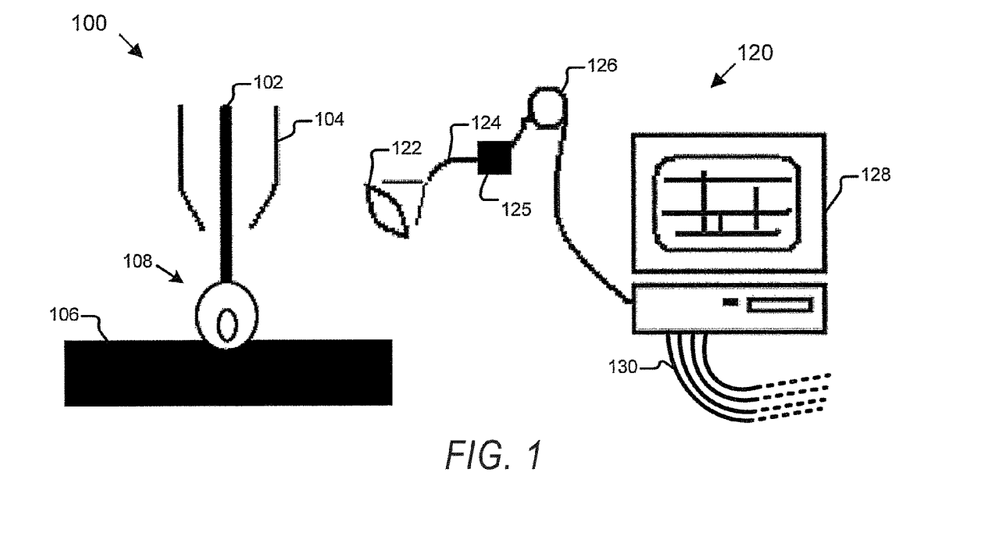
FIG. 1 is a schematic of an optical sensor for monitoring a welding process.

FIG. 1 illustrates a schematic of an optical sensor for monitoring a welding process, which includes a welding system 100, and a monitoring system 120. Welding system 100 is a laser welding system, as is known, although welding system 100 may be any fusion welding system capable of performing a welding operation, such as welding zinc-coated steel materials. Welding system 100 commonly includes a laser beam 102, a nozzle 104, a weld material 106, and a plasma plume emission 108. Welding system 100 typically joins multiple pieces of weld material 106 together using heat from laser beam 102, as is known. Weld material 106 is commonly a metal, such as steel. Certain weld materials 106, such as zinc-coated steel, pose additional welding challenges due to the presence of additional materials, such as zinc. For example, during a welding process, zinc can boil and create porous welds that can fail to meet certain regulatory or safety standards. Although the following description references welding zinc-coated steel, the disclosed system and methods may be used with any weld material 106 where multiple materials or elements are present. Further, the welding system 100 may be any type of welding process that involves a plasma plume emission 108, whether or not a laser beam 102 is incorporated.

Generally, monitoring system 120 monitors the materials present in plasma plume 108 to determine whether the weld will meet certain specifications. Monitoring system 120 calculates the ratio of materials present in plasma plume 108, such as the ratio of iron to zinc, by measuring and plotting various attributes of plasma plume 108, such as one or more spectral line intensities and electron temperatures, as will be discussed in greater detail below. Monitoring system 120 can compare current measured values against previously recorded benchmarks, and determine whether the current welding process will produce a weld that is within previously determined quality limits. Further, monitoring system 120 can also provide feedback to welding system 100 to alter one or more welding parameters to correct any perceived welding issues during a welding process. Monitoring system 120 generally includes a focusing lens 122, a fiber-optic cable 124, a photo detector 126, a computer 128, and one or more feedback loops 130.

Focusing lens 122 is generally an optical focusing lens or a tunable collimator that is capable of gathering light from plume emission 108. For example, focusing lens 122 may be an HPUCO-25-380-M-50PQ-SP with an SMA connector made by Oz Optics of Ottawa, Ontario, Canada, or an optics 84-series lens fixture with SMA connector made by Ocean Optics of Dunedin, Fla., or any fiber collimator made by Thorlabs of Newton, N.J. Generally, focusing lens 122 is connected to one or more photo detectors 126 by fiber-optic cable 124. Fiber-optic cable 124 can be any optical fiber capable of delivering the collected light from plume emission 108 to photo detector 126, such as any single/splitted optical fiber assembly made by Thorlabs or Ocean Optics. Fiber-optic cable may have a core diameter of 50 μm and a range of 190-800 nm (UV/SR-VIS).

Photo detector 126 may be one or more ultra-violet (UV), infra-red (IR), or visible light photo detectors, possibly with an integrated amplifier, that converts the received light spectra into electrical signals. In one embodiment, the photo detector 126 may be a high-speed fiber optic detector made by Thorlabs. In another embodiment, the photo detector 126 may be a HR 2000+ Ocean Optics spectrometer, available from Ocean Optics Inc. of Dunedin, Fla. Photo detector 126 may have a bandwidth of up to or greater than approximately 8 GHz, although the precise bandwidth may depend on the particular application. Photo detector 126 may also be preceded by an optical filter 125. Optical filter 125 may receive light from focusing lens 122 and filters the received light spectrum such that only desired light wavelengths are passed on to photo detector 126. Optical filter 125 may be any custom line filter made by Newport Oriel Instruments of Irvine, Calif., or any custom line filter or optic filter holder made by Ocean Optics. Generally, the desired light wavelengths correspond to the particular elements or materials of interest found in plasma plume 108, generally including weld material 106. In a welding processing where weld material 106 is zinc-coated steel, the desired light wavelengths generally correspond to zinc, iron, or both, as discussed in greater detail with reference to Table 1.

Generally, to properly capture the proper wavelengths using monitoring system 120, focusing lens 122 is generally positioned near plasma plume 108, generally within a range of approximately two inches to several meters, although the precise distance may vary by application and by the particular focusing lens 122. Generally, focusing lens 122 is placed far enough away from plasma plume 108 to prevent heat damage to the device, but is placed close enough to properly capture the desired light spectrum from plasma plume 108, within the general operational limits of the particular focusing lens 122. Welding system 100 may utilize a fixed or stationary laser beam 102, allowing focusing lens 122 to be placed in a fixed position near plasma plume 108. However, welding system 100 may utilize a moveable laser beam 102 that can travel along weld material 106. In such a system, focusing lens 122 may be fixed or attached to a device, robotic aim, laser beam emitter, or some other object that will travel along with the moveable laser beam 102. Generally, focusing lens 122 should remain at a fixed distance to plasma plume 108 during a welding operation to ensure consistent data that is ultimately provided to computer 128.

Computer 128 may be any computing device that includes a processor, a memory, and is capable of receiving and analyzing data from focusing lens 122 and/or photo detector 126. Computer 128 may include hardware and software analyzing the light spectrum emanating from plasma plume 108. Generally, computer 128 receives data from plasma plume 108, generally through focusing lens 122, optical filter 125, and photo detector 126. Computer 128 can then analyze such data, and may then provide a feedback signal to welding system 100 over one or more feedback loops 130. For example, in a laser welding system 100, feedback loops 130 may be connected to welding system 100 and used to alter one or more welding parameters, including power, welding speed, shielding gas flow rate, or any other controllable parameter of welding system 100. Altering such welding parameters may be done in real-time during a welding process of the current welding material, or altering such parameters may be applied prospectively to later welding processes. Computer 128 generally includes hardware and software for receiving and analyzing data in accordance with the disclosed theory of operation, as described in detail below.

Theory of Operation

Molten pool geometry, pool temperature, and plasma/plume are the physical parameters that may be monitored during a welding process involving welding system 100. Generally, such parameters can be monitored using monitoring system 120 by monitoring the plasma plume 108. These parameters are recognized to be a complicated nonlinear phenomenon relating to the independent parameters. The vaporized material, containing neutral atoms, ions, electrons, or the like, is known as a laser-produced plasma plume 108 and expands away from the melting pool surface. Physical parameters of plasma plume 108 can be correlated with the welding process very effectively.

Light emanating from plasma plume 108 is commonly referred to as a plasma plume spectrum. A plasma plume spectrum that is observed in the hottest region could be dominated by continuous, intense, broad-band radiation. Consequently, no discrete lines can be observed. The irradiation from other parts of the plume 108 can have resolved atomic emission lines, which are typically broadened to the Gauss or Doppler profile depending on neutrons, ions, and electrons interacting. The quality of a weld involving welding system 100 commonly depends on the plasma temperature and carrier concentration and has a strong correlation with the plasma plume spectrum. The parameters of plasma can be determined in several ways: from an intensity ratio of the ions or atoms emission lines; from a full width at half maximum (FWHM) of the line profile; or from a Boltzmann plot. The short wavelength part of a broad-band radiation spectrum also gives information about the temperature of plasma in the plasma plume 108. Atomic spectral lines can also be used to determine the elemental composition or the elemental concentrations in the welded sample.

Based on plasma spectroscopy theory that supplements the disclosed system and methods, the following assumptions are made for spectroscopic analysis: optically thin plasma; local thermal equilibrium; and critical electron density. In Equation 1, $N_e$ represents electron density [cm$^{-3}$], $T_e$ represents electron temperature, and $\Delta E$ represents the largest energy gap in the atomic energy level system.

$$N_e \geq 1.6 \times 10^{12} T_e^{1/2} (\Delta E)^3 \qquad \text{Equation 1}$$

Simplified, the above assumptions show that the plasma produced during a welding process will have particles with Maxwellian energy distributions and collisional processes will dominate over radiative ones. Typical electron densities in a plasma plume over a metal surface, estimated under welding conditions, exceed the critical value by two orders of magnitude. So, there is a very low probability of not having local thermal equilibrium during welding.

When a charged specie in the plasma makes a transition from a higher energy state (m) to a lower energy state (n), the differential amount of energy is released in the form of light emanating from plasma plume 108 that can be detected and analyzed using monitoring system 120. The intensity of the plasma emission line associated with this transition is given by Equation 2, where $I_{mn}$ represents the intensity of transition, $N_m$, represents the population of the upper state (m), $A_{mn}$ represents the transition probability, and $h\nu_{mn}$ represents the energy of transition.

$$I_{mn} = N_m A_{mn} h\nu_{mn} \qquad \text{Equation 2}$$

The population of the excited state, (m), is given by the Boltzmann distribution as describe by Equation 3, where N represents the total density of the state, $g_m$ represents the degeneracy, Z represents the partition function, $E_m$ represents the upper state energy level, k represents the Boltzmann constant, and T represents the electron temperature.

$$N_m = \left(\frac{N}{Z}\right) g_m e^{\left(-\frac{E_m}{kT}\right)} \qquad \text{Equation 3}$$

Equation 4 represents the substitution of Equation 3 in Equation 2.

$$\ln\left(\frac{I_{mn}\lambda_{mn}}{A_{mn}g_m}\right) = \ln\left(\frac{Nhc}{Z}\right) - \frac{E_m}{kT} \qquad \text{Equation 4}$$

Monitoring system 120 is capable of monitoring and recording the intensities of such transitions, using focusing lens 122 and photo detector 126. Using such information, monitoring system 120 can then indicate the presence of unique atomic species in the plasma. For measuring electron temperature in real-time, either the Boltzmann plot method or an extension of this method can be used. The ratios of zinc and iron line intensities and electron temperatures are simply mathematical extensions of the above two data sets.

Figure 2:
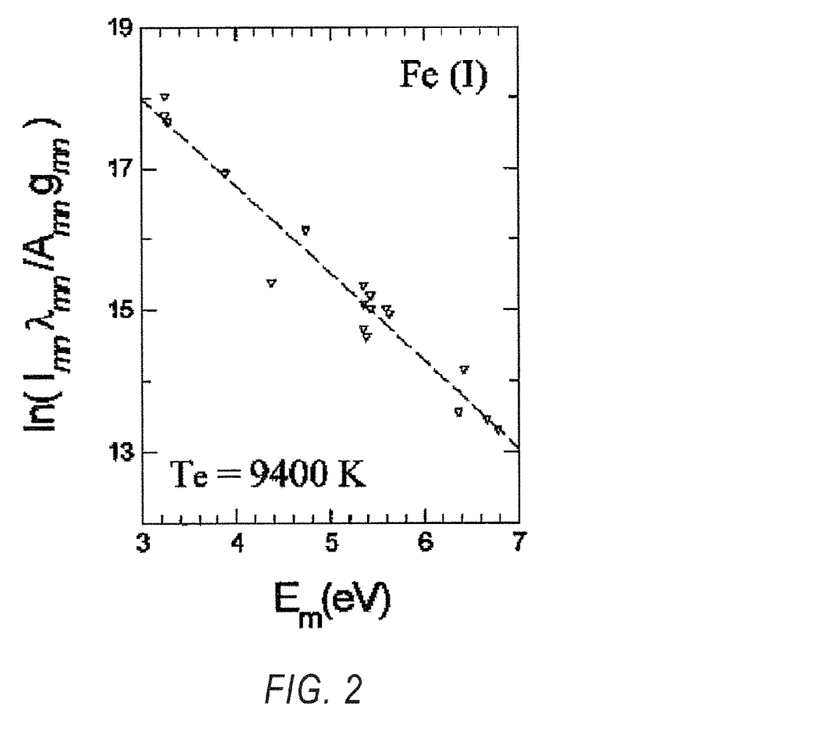
FIG. 2 is a graphical representation of a calculation of electron temperature by a Boltzmann plot method.

FIG. 2 illustrates a graphical representation of a calculation of the electron temperature by a Boltzmann plot method. By continuously plotting the first term of Equation 4 against $E_m$ for several transition lines, monitoring system 120 can estimate the electron temperature in real-time, which is related to the slope of the linear fit, as shown in FIG. 2. Each point in FIG. 2 comes from a single spectral line. By using more data points, the fitted line and the approximate slope can be better estimated. While a large number of points can give a better estimate of electron temperature, monitoring corresponding large number of spectral lines can be cumbersome and costly.

Another way to approximate the electron temperature of an element using the Boltzmann method is to select two spectral lines of that element which have considerably different upper state energy levels. This approach is like plotting two extreme points in FIG. 2, and then fitting a line through them. The considerable difference in energy levels (x-coordinate) of the two points reduces the amount of error in fitting the line and estimating its slope. In this approach, only two spectral lines of an element need to be monitored, hence it is also referred as the two-point Boltzmann method. The simplified equation for calculating electron temperature using two-point Boltzmann method is shown in Equation 5, where the numbers (1) and (2) denote two transition lines of a material.

$$T_e = \frac{E_m(2) - E_m(1)}{k\ln\left[\frac{I(1)A_{mn}(2)g_m(2)\lambda(1)}{I(2)A_{mn}(1)g_m(1)\lambda(2)}\right]} \qquad \text{Equation 5}$$

The above method, however, poses a computational difficulty in some cases, particularly where the axis temperature of the plasma is critical and/or significantly different from the periphery. Unfortunately, most welding plasmas fall in this category. In other words, the two-point Boltzmann method calculates the electron temperature at the periphery of the radiating plasma. In order to calculate the axis or the core plasma temperature, a complex method, known as Abel's Inversion, must be used. To make the process simpler, a previously reported modified two-point Boltzmann method is used for analyzing welding plasmas. The corresponding modified electron temperature equation is shown in Equation 6.

$$T_e = \frac{E_m(2) - E_m(1)}{k\ln\left[\frac{E_m(1)I(1)A_{mn}(2)g_m(2)\lambda(1)}{E_m(2)I(2)A_{mn}(1)g_m(1)\lambda(2)}\right]} \qquad \text{Equation 6}$$

Depending on the application, monitoring system 120 can include computer readable instructions for monitoring electron temperatures using any of the above mentioned methods. After reviewing an atomic transitional probability database, such as one provided by the National Institute of Science and Technology (NIST) of Gaithersburg, Md., suitable lines for monitoring zinc and iron in the plasma were identified. Table 1 shows the set of lines and the properties that can be used for intensity and electron temperature measurements.

TABLE 1

Zinc and Iron lines suitable for monitoring weld quality

| | $\lambda_{mn}$ (nm) | $E_m$ (eV) | $g_m$ | $A_{mn} \times 10^8$ (s$^{-1}$) |
|---|---|---|---|---|
| Zn I | 328.233 | 7.782859 | 3 | 0.8657 |
| | 330.258 | 7.783265 | 5 | 1.072 |
| | 334.502 | 7.783880 | 7 | 1.5 |
| | 468.014 | 6.654963 | 3 | 0.1553 |
| | 472.215 | 6.654963 | 3 | 0.4576 |
| | 481.052 | 6.654963 | 3 | 0.7004 |
| Fe I | 382.588 | 4.154353 | 7 | 0.598 |
| | 385.991 | 3.211188 | 9 | 0.097 |
| | 426.047 | 5.30853 | 7 | 0.63112 |
| | 427.176 | 4.3865 | 11 | 0.22466 |

Once the intensity and electron temperature profiles of zinc and iron are available, they can be combined to obtain a profile of their relative composition in plasma by taking ratios. So, if the ratio of iron to zinc is plotted, a lower value will suggest higher zinc concentration in the plasma and vice versa.

By conducting a design of experiment, parameters for producing best welds can be identified for zinc-coated steel. The best welds, or in other words, welds with optimal properties, can then be used for comparison in a given processing parameter domain. First, using monitoring system 120, all three data sets mentioned above, including line intensity, electron temperature and the ratio of iron and zinc in plasma, can be recorded. These data sets can then be statistically processed (means and standard deviations) and used as benchmarks for testing quality of actual production welds. In other words, the deviations in recorded statistics of the actual welds from the best weld can be used to predict in-process weld quality. Generally, in order to use monitoring system 120 to monitor and improve overall weld quality, a series of quality benchmarks are typically established prior to use in a production environment.

Figure 3:
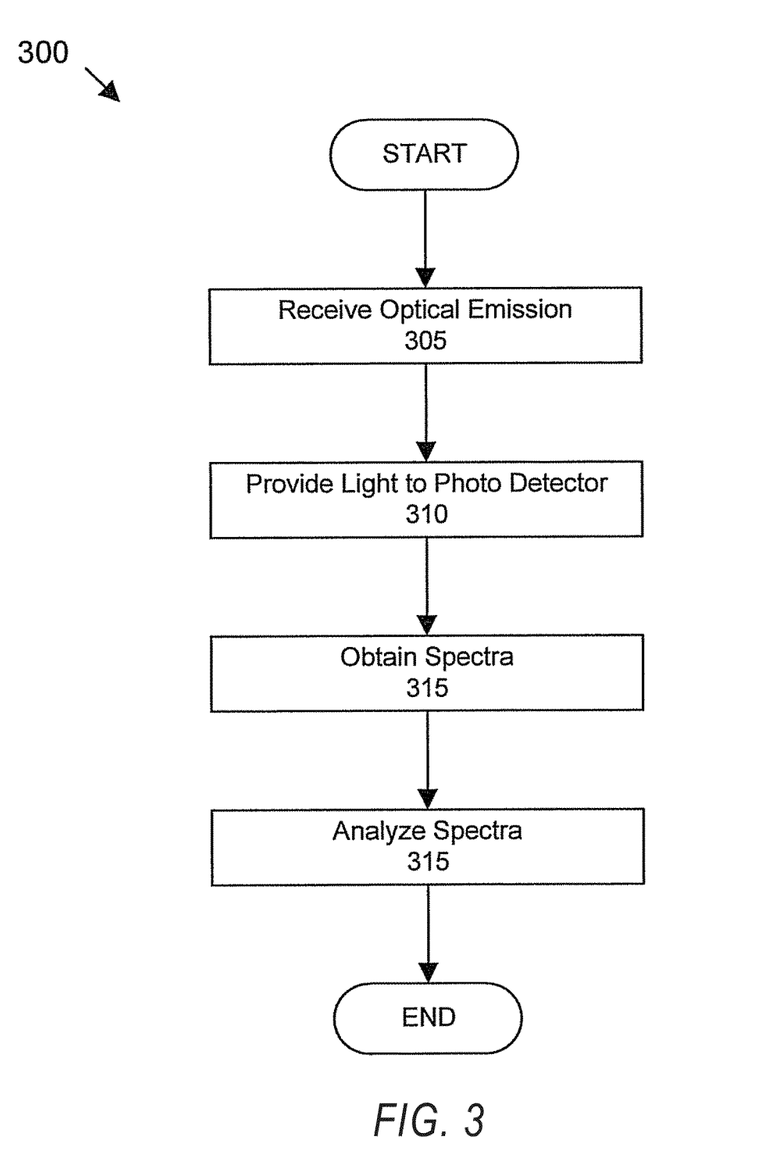
FIG. 3 illustrates an exemplary process 300 for analyzing a light spectrum of a plasma plume.

FIG. 3 illustrates an exemplary process 300 for analyzing a light spectrum in plasma plume 108. Process 300 begins in step 305 when monitoring system 120 receives optical emission. Generally, optical emission from plasma plume 108 is collected using focusing lens 122. Focusing lens 122 can be either an optical focusing lens, or a tunable collimator depending on the working distance (distance between plasma source and lens/collimator) and required flexibility. A fiber-coupled tunable collimator assembly may be used for production environments.

Next, in step 310, light is provided to photo detector 126. Once the light is available from focusing lens 122, the light is then provided to one or more photo detectors 126 for further processing. Generally, the light is provided from focusing lens 122 to photo detector 126 by fiber-optic cable 124.

Next, in step 315, a spectra is obtained. Monitoring system 120 includes ultra-violet and visible light photo detectors 126, which may also include integrated amplifiers. Photo detectors 126 may be preceded by optical filters which transmit only the desired wavelengths, generally corresponding to zinc and/or iron for an application involving weld material 106 of zinc-coated steel. The spectral region of interest may be the one as shown in Table 1 or any other pertinent region in the entire light spectrum. As such, the number of optical filters and photo detectors may vary depending upon the application.

Next, in step 320, the spectra are analyzed using computer 128. Photo detectors 126 selectively measure the intensity of zinc and/or iron lines during a welding process. The values of those intensities are continuously recorded using computer 128 using any suitable I/O board and software. The real-time intensities of zinc and iron lines are used to compute electron temperature of zinc and iron as above. If needed, the ratios of intensities and electron temperatures of iron and zinc lines are also computed using computer 128.

Following step 320, statistical means and standard deviations of all data sets are computed. Since all these computations are done by computer 128 during a welding process, the results can be displayed as plots of quality parameters between acceptable control limits. As mentioned earlier, the control limits of quality parameters are first obtained from good/acceptable welding benchmarks, generally made with optimal welding parameters. During production, these control limits can be used to predict the quality of welds made.

As an example, consider a benchmark of an optimal weld repeatedly showed mean values of iron intensity Fe(I), zinc intensity Zn(I), iron electron temperature Fe(ET), zinc electron temperature Zn(ET), and ratios Fe(I)/Zn(I) and Fe(ET)/Zn(ET) as 5000, 1000, 15000 K, 5500 K, 5 and 2.72 respectively. Now, the presence of excessive zinc vapor at any point during welding will increase the optical emission of zinc, which will be instantaneously recorded by monitoring system 120. If this measured intensity and electron temperature of zinc is found to be higher, and the Fe/Zn ratios lower than the optimal weld values listed above, monitoring system 120 can immediately report that there is likely a problem in the weld.

Additionally, other factors such as bead separation, gaps between welds, and welding system variations (e.g., laser power, gas flow, etc.) which are very commonly observed on production systems may also affect the plasma emission. Such variations can also be captured by monitoring system 120. For example, feedback loops 130 may be configured to conduct bi-directional communication with another computer, such as a computer that is configured to control and monitor various system parameters of welding system 100.

Figure 4:
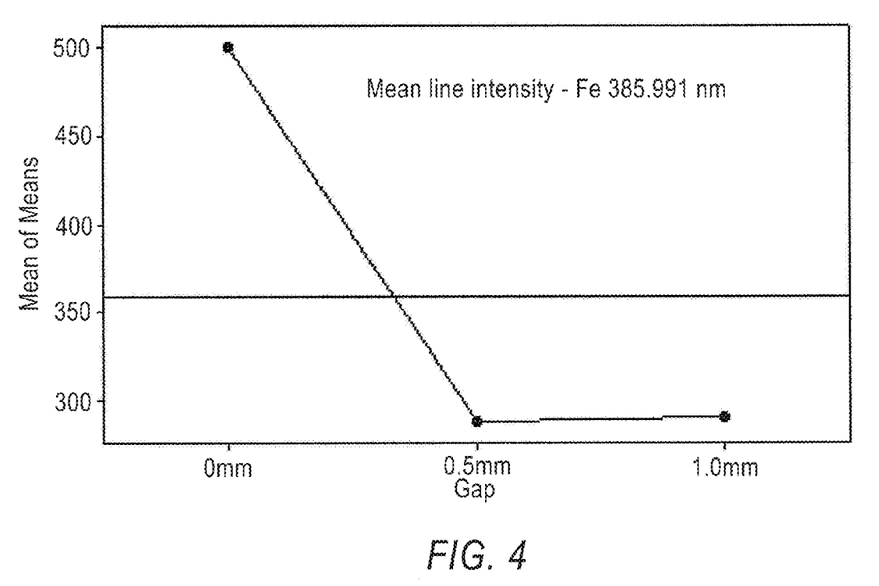
FIG. 4 is a graphical representation of a mean line intensity of Fe (385.991 nm) that reduces sharply with any gap/bead separation.
Figure 5:
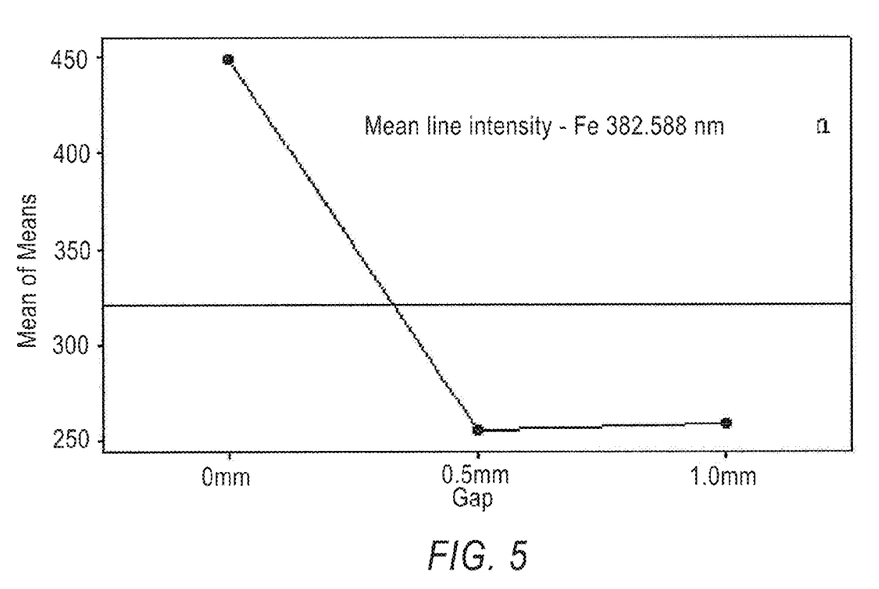
FIG. 5 is a graphical representation of a mean line intensity of Fe (382.588 nm) that reduces sharply with any gap/bead separation.

FIGS. 4 and 5 illustrate a distinguishable difference in recorded mean emission intensities of iron when a gap was intentionally created for welding. For example, FIGS. 4 and 5 illustrate that any gap/bead-separation during a welding process reduces the mean iron line intensity significantly. Monitoring system 120 may record such information, so that in the future, monitoring system 120 can detect such a decrease in intensity and can immediately report a defect, and also map the location of the defect on the weld.

Figure 6:
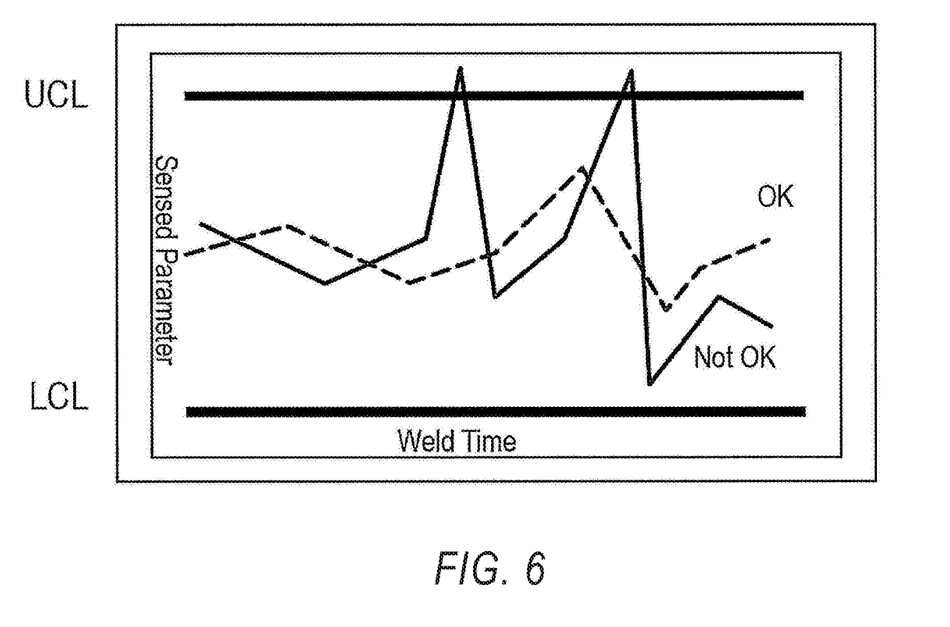
FIG. 6 is a graphical representation of an output from a monitoring system.

FIG. 6 is a graphical representation of an output from monitoring system 120. FIG. 6 illustrates one example, where monitoring system 120 provides a simplistic weld screening graph showing that a weld is either OK or not OK. Generally, an OK weld indicates that the analyzed spectra shows that the weld meets previously set specifications, as indicated by the previously taken benchmarks. In turn, a weld that is Not OK, generally fails to meet the stated weld specifications. Such an output may be presented in real-time based on the upper (UCL) and lower (LCL) control limits of quality parameters (mean and/or standard deviation of line intensity, electron temperature or Fe/Zn ratios) established from good/acceptable welds.

Monitoring system 120 can also be integrated with a suitable feedback controller for providing a feedback signal to control a welding parameter. For example, monitoring system 120, through feedback loops 130, can provide a signal to alter various welding parameters, including power, welding speed, shielding gas flow rate, etc. Such weld parameters can then be altered during the process to obtain best weld quality.

Figure 7:
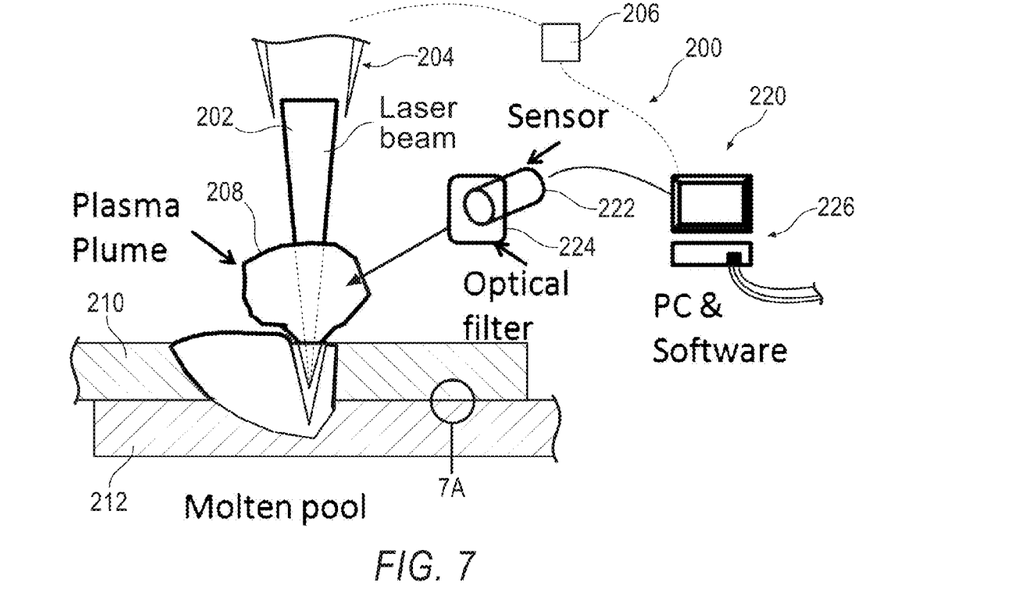
FIG. 7 is a schematic illustration of an alternative embodiment of a welding system.

FIG. 7 illustrates an alternative embodiment of the system 100 as a welding system 200. The welding system 200 includes a laser beam 202 emitting from a laser welder 204, a welder control 206, a plasma plume 208, a first sheet steel 210, a second sheet steel 212, and a monitoring system 220. In the embodiment illustrated, the monitoring system 220 includes a sensor 222, an optical filter 224, and a processor 226. The processor 226 may be connected to the welder control 206 for adjusting the welder 204 to correct detected undesirable conditions. In the embodiment of FIG. 7, the first sheet steel 210 and the second sheet steel 212 are arranged to form a welded lap joint.

Figure 7A:
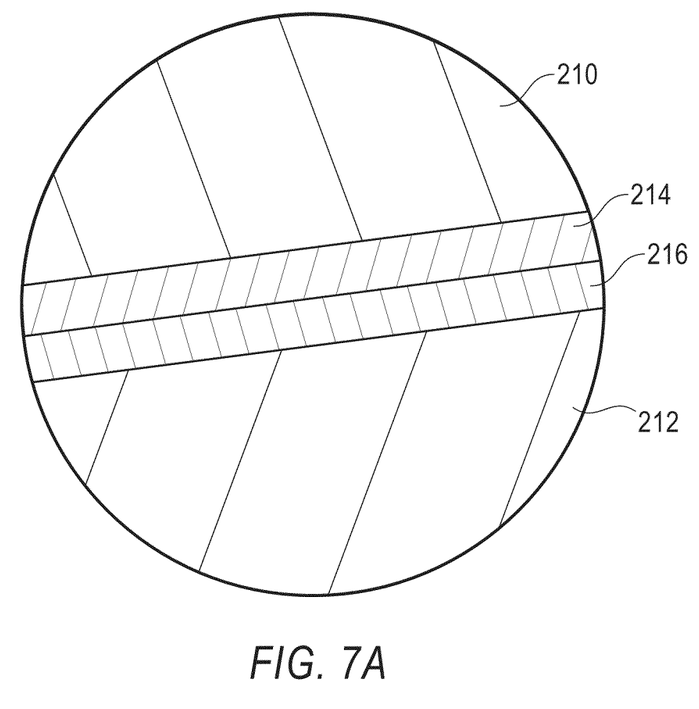
FIG. 7A is an enlarged view of portion 7A of FIG. 7.

FIG. 7A illustrates the sheets 210 and 212 in greater detail where the first sheet steel 210 includes a layer of zinc 214 attached thereto and the second sheet steel 212 includes a layer of zinc 216 attached thereto.

The information detected by the sensor 222 may be transferred to the processor 226 or analysis tools through a Data Acquisition board. Although the welder of the illustrative embodiment is a laser welder, any suitable welder, including an arc welder may be used.

Figure 12:
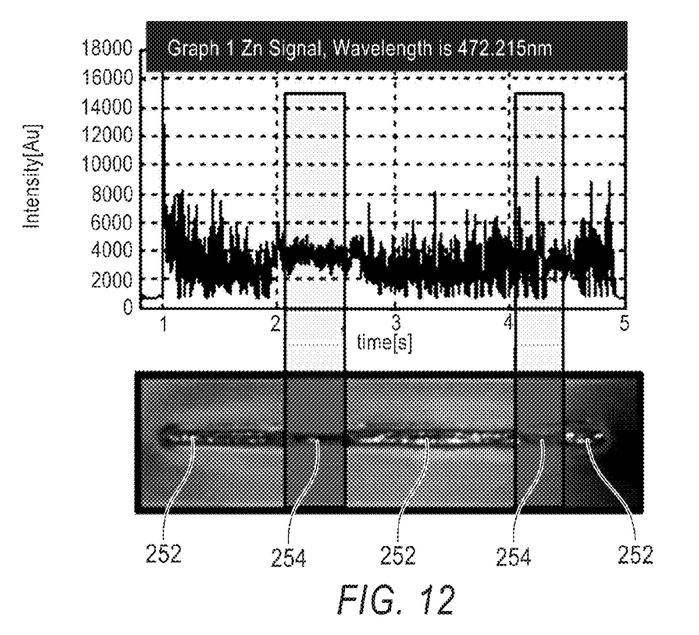

As best seen in FIG. 12, a weld seam 240 includes a plurality of acceptable weld portions 252 and a plurality of undesirable weld portions 254. The monitoring system 220 may be used to detect when the welder 204 begins to produce an undesirable weld portion 254 and provide a signal to the welder control 206 for adjusting the process for correcting the detected deficiency.

The principle of emission spectroscopy is used to detect information from the plasma plume 208. That is, the plasma plume 208, which is generated in fusion welding, provides information such as spectral intensity, electron density, and electron temperature of each species of target materials detected in the plume 208. The vaporized material which comprises the plasma plume 208 reflects some physical behavior of the welded zone. The system 200 enables a user to predict welding quality by analyzing the plasma plume 208.

In order to analyze the behavior of the plasma plume, Local Thermodynamic Equilibrium (LTE) is assumed to be valid and Equation 1, as stated above, is satisfied, where $N_e$ is electron density, $T_e$ is electron temperature, $\Delta E$ is energy gap Under the Local Thermodynamic Equilibrium (LTE) and optically thin plasma, the excited population follows the Maxwell Boltzmann distribution shown in equation 7.

$$\frac{N_n}{N} = \frac{g_n}{Z(T)} \exp(-E_n/kT) \qquad \text{Equation 7}$$

Where $N_n$, is upper state population, N is the total density of the energy level, $g_n$ is the degeneracy, the statistical weight, Z(T) is the partition function, $E_n$ is the upper state energy level, k is the Boltzmann constant and T is the temperature.

ranging between 300 nm and 500 nm, as seen in Table 2, since multiple atomic emission lines exist within the spectrum.

The location of the high relative spectral intensity lines within the spectrum will be different because this depends on the laser, shielding gas, and target material. Those can give different conditions for ionization levels. Its amount also depends on ionized levels. Under the conditions of our experiment (a $CO_2$ laser with 40 standard cubic feet per hour (SCFH) of He shielding gas), six intensity lines have a high intensity and are selected.

TABLE 2

Zinc atomic spectral data between 300 nm and 500 nm

| Wavelength [nm] | Transition Probablity | E_lower_level | J_lower | E_upper_lev. | J_upper |
|---|---|---|---|---|---|
| 301.8355 | 3.58E+06 | 4.006367 | 0 | 8.113123 | 1 |
| 303.5777 | 1.06E+07 | 4.029934 | 1 | 8.113123 | 1 |
| 307.2061 | 1.70E+07 | 4.078159 | 2 | 8.113123 | 1 |
| 328.2328 | 8.66E+07 | 4.006367 | 0 | 7.782859 | 1 |
| 330.2584 | 1.07E+08 | 4.029934 | 1 | 7.783265 | 2 |
| 330.2941 | 5.96E+07 | 4.029934 | 1 | 7.782859 | 1 |
| 334.5015 | 1.50E+08 | 4.078159 | 2 | 7.78388 | 3 |
| 334.557 | 3.75E+07 | 4.078159 | 2 | 7.783265 | 2 |
| 334.5937 | 4.17E+06 | 4.078159 | 2 | 7.782859 | 1 |
| 379.9001 | 8.64E+05 | 5.796083 | 1 | 9.058977 | 0 |
| 396.5432 | 1.44E+06 | 5.796083 | 1 | 8.922035 | 0 |
| 429.8328 | 2.69E+06 | 5.796083 | 1 | 8.679942 | 0 |
| 462.9813 | 1.49E+06 | 5.796083 | 1 | 8.473467 | 2 |
| 468.0134 | 1.55E+07 | 4.006367 | 0 | 6.654963 | 1 |
| 472.2153 | 4.58E+07 | 4.029934 | 1 | 6.654963 | 1 |
| 481.0528 | 7.00E+07 | 4.078159 | 2 | 6.654963 | 1 |

The relative spectral intensity is described by Equation 2, as stated above, where $I_{mn}$ is the relative spectral intensity, $N_m$ is the upper state population, $A_{mn}$ is the transition probability between two quantized energy level (m,n), h is Planck constant and $v_{mn}$ is frequency.

In the embodiments illustrated, there are two methods to calculate the electron temperature. The first method is to use the relationship of Equation 8 using a relative intensity ratio.

$$T_e = \frac{E_m(2) - E_m(1)}{k \ln\left[\frac{E_m(1)I(1)A_{mn}(2)g_m(2)\lambda(1)}{E_m(2)I(2)A_{mn}(1)g_m(1)\lambda(2)}\right]} \qquad \text{Equation 8}$$

The second method is by using the Boltzmann plot which provides better accuracy. By selecting several spectral lines and linear fittings Equation 4, as stated above, we can estimate the electron temperature.

Description and Experimental Procedure $I_{mn}$, as recited in the equations is the direct information from spectrometer 222. This information is a primary factor which reflects welded quality.

As an example, the system 200 may be used with zinc-coated steel. In one embodiment, the steel sheet is hot dipped, although other processes for galvanization may be used.

Figure 8:
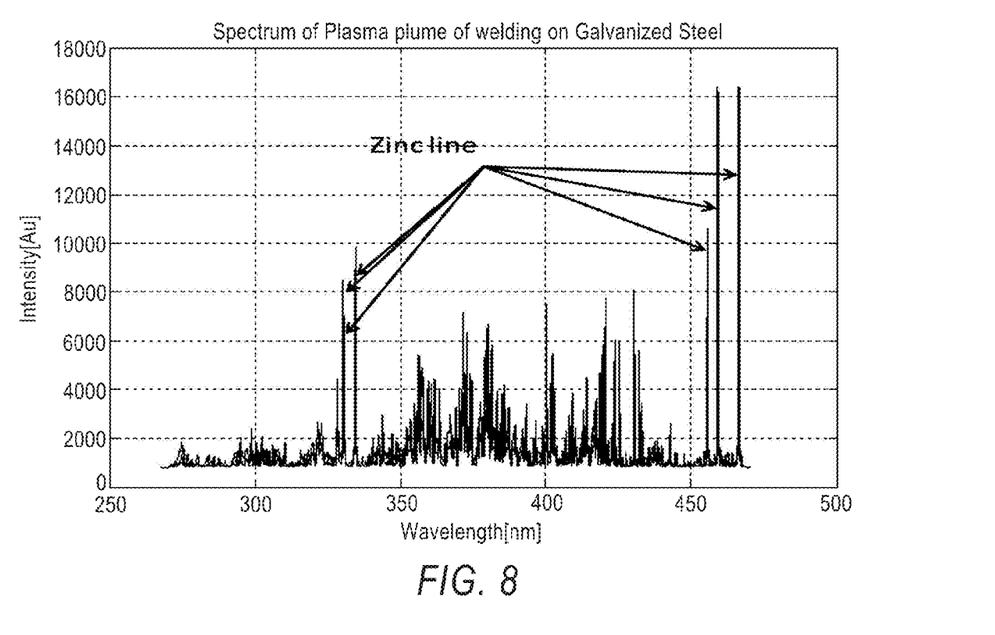
FIG. 8 is an exemplary spectrum of a plasma plume as detected by a monitoring system.

In one exemplary method of operation for the system 200, spectral data of the plasma plume 208 is recorded with 1 millisecond (ms) integration time using a HR 2000+ Ocean Optics spectrometer (sensor 222) during welding. FIG. 8 illustrates the data in a wavelength domain. Among the data, several lines with high relative intensity were selected and compared over time. The lines selected were six zinc lines The wavelengths of the selected lines are 328.2328, 330.2941, 334.5015, 468.0134, 472.2153, and 481.0528. From these selected lines, welding defects such as bead separation, burn-through, and underfill were detected in the time domain.

Results of Detecting Three Kinds of Welding Defects

All experiments were implemented under the lap joint configuration of zinc-coated sheet metal.

EXAMPLE 1

Bead Separation

Figure 9:
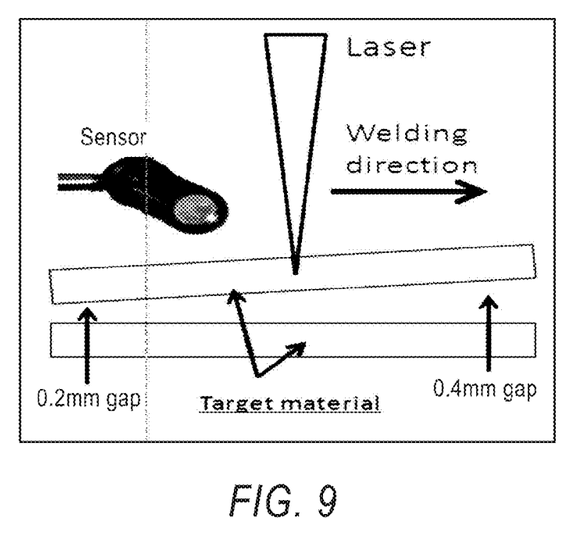
FIG. 9 is a schematic illustration of a welding process to produce a bead separation.
Figure 10:
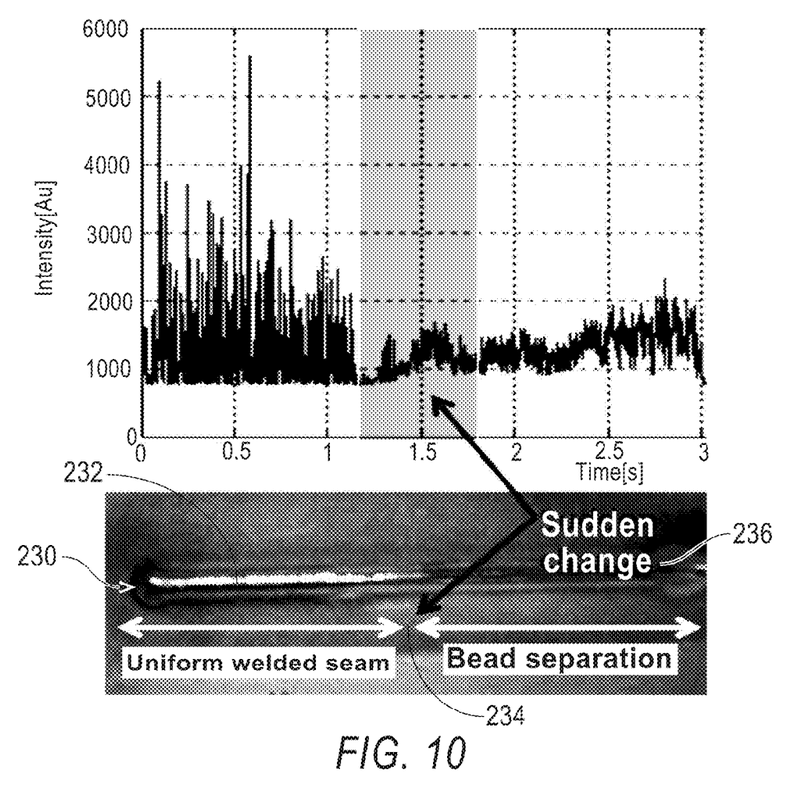
FIG. 10 is a graphical illustration of the spectral signal variation paralleled with an illustration of the weld with a partial bead separation.

In this example, an undesirably large gap exists between two sheets of galvanized steel during welding, thereby causing the weld bead to separate, which is commonly referred to as bead separation. Initially, in order to determine the gap distance where bead separation may begin to occur, many experiments with different gap distances (from no gap to about 0.5 millimeter (mm) gap) were performed (as best seen in FIG. 9) and the corresponding spectral analysis was conducted and recorded. As a result, weld seams applied to the sample with about 0.2 mm gap, the weld seam 230 shape was uniform, resulting in an acceptable weld portion 232 (FIG. 10). However, starting from about 0.3 mm, the weld seam applied was a non-uniform weld portion 234, and after 0.4 mm, bead separation occurred. In order to detect signal transition between those two areas of acceptable weld portion 232 and bead separation 236, the experiments with different gap sizes at both ends (about 0.2 mm gap and about 0.4 mm gap, respectively) were done. FIG. 9 illustrates a schematic of experimental setup.

As seen in FIG. 10, the welded seam 230 became non-uniform after center area of the seam. At the same time, in the plot of FIG. 10, the spectral intensity suddenly changed in that region. Up to 1.2 seconds (sec), standard deviation of spectral intensity was about 563. Whereas starting from shaded area (between about 1.2 sec and 1.8 sec), the standard deviation of spectral intensity was sharply reduced to about 258. Therefore, in order to detect bead separation, the standard deviation for spectral intensity is one data source of interest. Accordingly, the monitoring system 220 will monitor the expected standard deviation of spectral intensity for the plasma plume 208 (for a selected wavelength) to determine when the change in standard deviation of spectral intensity is indicative of bead separation.

EXAMPLE 2

Underfill

Figure 11:
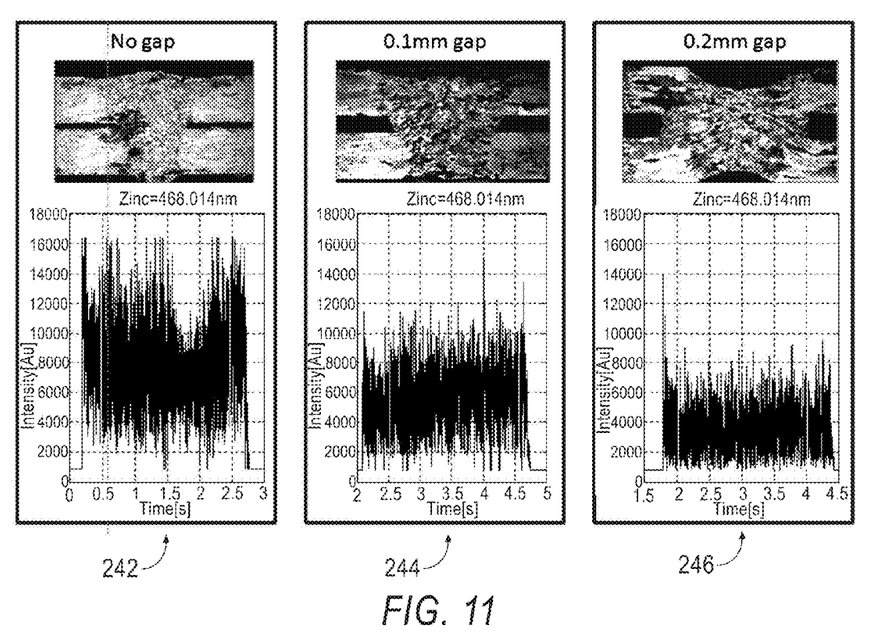
FIG. 11 is a graphical illustration of the spectral signal variation paralleled with an illustration of the weld with a partial underfill.

Another welding defect is underfill. A small gap between lap joint configurations causes underfill. FIG. 11 illustrates three weld seams in section with their associated intensity spectra taken at a selected wavelength for zinc. A first configuration 242 is indicative of an acceptable weld seam with no underfill. A second configuration 244 is indicative of a weld seam with some amount of underfill. A third configuration 246 is indicative of a weld seam with an undesirable amount of underfill. The underfill of the second configuration 244 may be acceptable or unacceptable, as desired. The three illustrations in FIG. 11 illustrate that as gap size increases underfill increases. Also, from the graph pertaining to each weld section, the inventors have discovered that as underfill increases, the average of the spectral intensity is reduced. Accordingly, the monitoring system 220 will monitor the average spectral intensity for the plasma plume 208 (for a selected wavelength) to determine when the change in average spectral intensity is indicative of underfill.

EXAMPLE 3

Burn-through

A further defect is burn-through. Excessive heat input may cause burn-through. In order to simulate burn-through, a higher power and a slower welding speed compared to the normal condition were executed in portions 254 of the weld seam 250 of FIG. 12. FIG. 12 also illustrates the spectral variation in the portions 254 caused by the burn-through. As a result, if there is a burn-through, the standard deviation of spectral intensity generally decreases. For burn-through detecting, the inventors have discovered that the variation of standard deviation of spectral intensity is indicative of burn-through. However, this is the same result as in the bead separation case. Therefore, standard deviation alone is not enough to detect the burn-through because the burn-through results from high heat input. To measure the degree of the heat input, electron temperature was added to detect the burn-through. The results are as follows.

Figure 13:
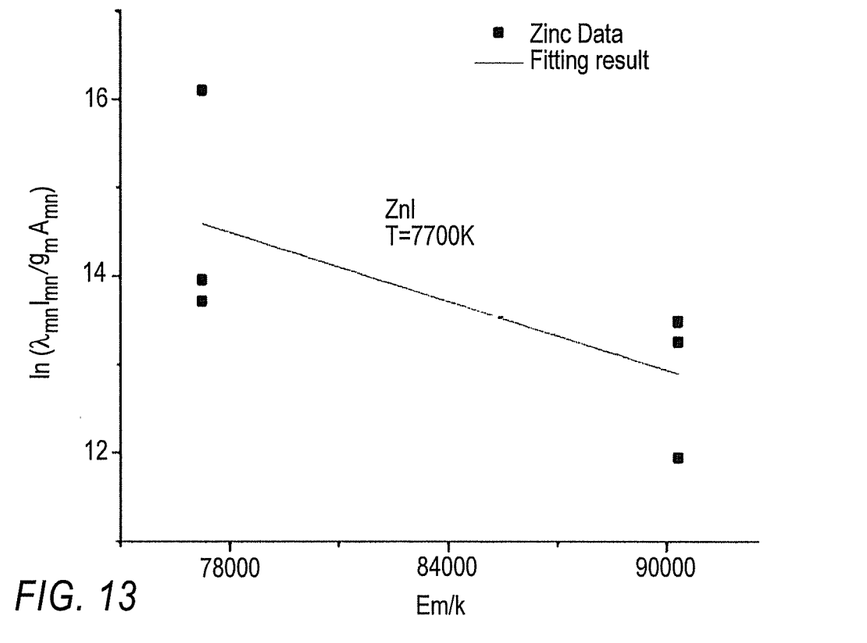
FIG. 13 is a graphical representation of a calculation of electron temperature as measured at normal condition.
Figure 14:
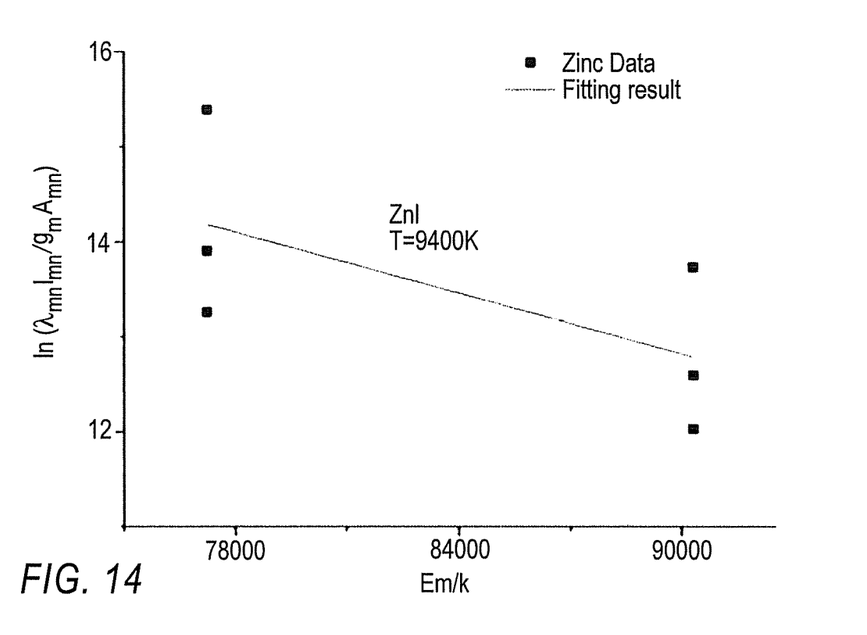
FIG. 14 is a graphical representation of a calculation of electron temperature as measured at a burn through condition.

From the zinc atomic properties as shown in FIG. 13, the electron temperature was calculated using equation 11, Boltzmann plot method. As shown in FIG. 13, the electron temperature was about 7700K in normal condition. However, as indicated in FIG. 14, the electron temperature was increased to about 9400K. Thus, the electron temperature shows temperature profiles of the plasma plume.

Referring back to FIG. 7, the optical filter 224 may permit the transmittance of chosen lines which reflect selected physical behaviors of welded quality. A photodiode has sensitive spectral range. However, other lines except useful lines within that range can be noisy in signal analysis. Therefore the optical filter 224 may be used to filter out the undesired lines of the spectrum. The sensor 222 may be a UV photodiode or an IR photodiode.

Computer 128 may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Further, computer 128 is capable of executing instructions stored on a computer readable medium. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A method of monitoring a welding process, comprising:
spatially and temporally detecting a selected portion of a light spectrum of plasma plume of a fusion welding process with a photo detector;
processing the detected portion of the spectrum to determine a line intensity, an electron temperature, and relative quantities of iron and zinc in the plasma plume;
comparing the detected portion of the spectrum with an expected spectra to determine whether a weld is acceptable;
providing a signal to a welder control, the signal representing the presence of a weld defect; and
adjusting the weld process based on the signal to correct the weld defect.

2. The method of claim 1, further comprising detecting a vaporized material that expands away from a welding melt pool surface, wherein the vapor is indicative of at least one of an underfill defect condition, a bead separation defect condition and a loss of a coating defect condition.

3. The method of claim 1, further comprising filtering the spectrum of the plasma plume with an optical filter interposed between the plasma plume and the photo detector to provide a spectral region of interest to the photo detector.

4. The method of claim 1, further comprising positioning a focusing lens near the plasma plume at a range of approximately 2 inches to 5 meters away, wherein the focusing lens is optically connected to the photo detector.

5. The method of claim 1, further comprising positioning a focusing lens near the plasma plume and at an outer edge of the effective heat of a welding process, wherein the focusing lens is optically connected to the photo detector.

6. The method of claim 1, further comprising maintaining a fixed distance between the plasma plume and a focusing lens.

7. The method of claim 1, further comprising detecting a differential amount of energy between a first energy state and a second energy state to determine electron temperature.

8. The method of claim 1, further comprising recording at least the line intensity, the electron temperature and the ratio of iron and zinc in the plasma plume.

9. The method of claim 1, further comprising processing data from at least one of the line intensity data set, the electron temperature data set and the relative quantities of iron and zinc in the plasma plume data set, wherein the data is used to predict an in-process weld quality.

10. The method of claim 1, further comprising communicating bi-directionally between a first computer configured to analyze and predict a welding plasma plume with a second computer configured to control and monitor various parameters on a welding system.

11. A welding system comprising:
a metal substrate;
a welder, wherein at least one material is fused by a weld, wherein the weld creates a plasma plume emission;
a welding controller;
a monitoring system, wherein the monitoring system includes at least one optical sensor;
a computing device, wherein the computing device is configured to calculate a ratio of materials in the plasma plume emission, and wherein the computing device measures and plots at least one spectral line intensity, at least one electron temperature and at least one ratio that is recorded; and
a feedback loop, wherein the feedback loop provides the welder control and an operator with a weld quality result; and
wherein the monitoring system is configured to generate a signal that represents a weld defect based on a spectral analysis of light in the plume emission and control the weld controller to correct the weld defect in accordance with the signal.

12. The welding system according to claim 11, further comprising a focusing lens, wherein the focusing lens is at least one of an optical focusing lens and a tunable collimator, and wherein the focusing lens gathers light from the plasma plume emission to detect at least one of an underfill defect condition, a bead separation defect condition and a loss of coating defect condition.

13. The welding system according to claim 11, further comprising an optical filter, wherein the optical filter receives light from a focusing lens to filter a received light spectrum prior to transmission into a photo detector, wherein the optical filter is configured to pass light corresponding to at least one of zinc and iron.

14. The welding system according to claim 11, further comprising a photo detector, wherein the photo detector is at least one of an ultra-violet, infra-red and visible light detector.

15. The welding system according to claim 14, wherein the photo detector includes an integrated amplifier for converting received light spectra into an electrical signal.

16. The welding system according to claim 11, wherein the metal substrate is a zinc-coated steel.

17. The welding system according to claim 11, wherein the welding system includes at least one of a metal fusing laser welder and a metal fusing arc welder.

18. The welding system according to claim 11, wherein the computing device includes feedback controller having bi-directional communication with a second computing device.

19. The welding monitoring system according to claim 11, wherein a spectral data of the plasma plume is recorded with at least a 1 millisecond integration time by the optical sensor.

20. The welding system according to claim 11, wherein the optical sensor includes an in-situ sensor and can determine in process defects of a weld bead.

21. A method of monitoring a welding process, comprising:
spatially and temporally detecting a selected portion of a light spectrum of plasma plume of a fusion welding process with a photo detector;
processing the detected portion of the spectrum to determine a line intensity, an electron temperature, and relative quantities of iron and zinc in the plasma plume;
recording at least the line intensity, the electron temperature and the ratio of iron and zinc in the plasma plume;
comparing the detected portion of the spectrum with an expected spectra to determine whether a weld is acceptable;
predicting an in-process weld quality based at least in part on the line intensity, the electron temperature, and the relative quantities of iron and zinc;
generating a signal representing the weld quality, the signal representing the presence of a weld defect; and
adjusting the weld process based on the signal to correct the weld defect.

* * * * *